(12) United States Patent
Mäntylä et al.

(10) Patent No.: US 6,423,185 B1
(45) Date of Patent: Jul. 23, 2002

(54) PROCESS OF SURFACE TREATMENT FOR FACES THAT BECOME CONTAMINATED IN A PAPER OR BOARD MACHINE

(75) Inventors: Tapio Mäntylä, Tampere; Pentti Lehtonen, Jyväskylä; Petri Sorsa, Tampere, all of (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/623,692

(22) PCT Filed: Mar. 2, 1998

(86) PCT No.: PCT/FI99/00158

§ 371 (c)(1),
(2), (4) Date: Nov. 24, 2000

(87) PCT Pub. No.: WO99/45076

PCT Pub. Date: Sep. 10, 1999

(30) Foreign Application Priority Data

Mar. 3, 1998 (FI) .................................................. 980480

(51) Int. Cl.[7] .............................. D21F 7/00; C23C 22/02
(52) U.S. Cl. ........................................ 162/199; 148/283
(58) Field of Search .................................. 162/198, 199, 162/263, 272, 358.1, 368, 373; 34/108; 427/421, 422, 409, 419.5, 444; 492/20, 53; 148/248, 95, 274, 275, 283

(56) References Cited

U.S. PATENT DOCUMENTS

| | | | | |
|---|---|---|---|---|
| 3,012,917 A | * | 12/1961 | Riou et al. | 148/272 |
| 3,630,790 A | * | 12/1971 | Schmidt et al. | 148/248 |
| 3,942,230 A | * | 3/1976 | Nalband | 482/53 |
| 4,202,706 A | * | 5/1980 | Newell et al. | 428/457 |
| 4,568,573 A | * | 2/1986 | Sunada et al. | 427/350 |
| 4,625,430 A | * | 12/1986 | Aula et al. | 34/13 |
| 4,757,145 A | * | 7/1988 | Caporricio et al. | 546/81 |
| 5,449,415 A | * | 9/1995 | Dolan | 148/259 |
| 5,564,196 A | * | 10/1996 | Nomura et al. | 34/110 |
| 5,632,861 A | * | 5/1997 | Crouse | 162/358.1 |
| 5,879,623 A | * | 3/1999 | Glover et al. | 422/14 |

FOREIGN PATENT DOCUMENTS

| | | | | |
|---|---|---|---|---|
| EP | 0728866 | | 8/1996 | ............ D21F/3/08 |
| FR | 2163808 | | 7/1973 | ............ B44D/1/00 |
| JP | 5-84468 | * | 4/1993 | ............ B05D/7/24 |
| JP | 10-427 | * | 1/1998 | ............ B05D/3/02 |

* cited by examiner

Primary Examiner—Peter Chin
Assistant Examiner—Eric Hug
(74) Attorney, Agent, or Firm—Steinberg & Raskin, P.C.

(57) ABSTRACT

The invention concerns a process for treatment of faces that contain chromium or aluminum in a paper/board machine or in a finishing machine. A fluorine compound of low surface energy is applied onto the face, which compound is made to adhere to the chromium or aluminum atoms in the face.

9 Claims, No Drawings

… … …

PROCESS OF SURFACE TREATMENT FOR FACES THAT BECOME CONTAMINATED IN A PAPER OR BOARD MACHINE

FIELD OF THE INVENTION

The invention concerns a process of surface treatment for pieces and faces that tend to become contaminated in a paper/board machine or in a finishing machine.

BACKGROUND OF THE INVENTION

In paper and board machines and in their finishing machines, there is a great number of faces whose contamination causes costs and problems related to production. Contaminants, which include particles of solid matter, fillers, stickies, pitch, etc. material that can be classified as contaminations, tend to adhere, for example, in a headbox to the flow faces in the headbox and cause alteration of the flow from a desired laminar flow to a turbulent flow. In the wire part, different faces collect contaminants, which can then fall down onto the web and cause disturbance in the web. Spreader rolls in coating stations collect an adhesive mix on the rolls, in which connection the rolls are contaminated and become gradually unusable. Washing of contaminated spreader rolls is a highly laborious operation, which causes additional costs. Calender rolls are contaminated, and on contamination they cause problems in the product. Attempts have been made to reduce contamination by mechanical means, such as by means of doctors, water jets, and by means of frequent washing during standstills. Attempts have also been made to find chemical means in order to make the faces contamination-repellent, for example, by means of fluorination treatments. In the FI Patent Application 941620, fluorination treatment of a roll face is described by means of pressure polishing, in which case a piece of a fluoroplastic is pressed against the face of a revolving roll so that fluorine adheres to the roll face. In the FI Patent Application 950849, treatment of faces in a paper machine, in particular of a roll face, with a polymeric surface treatment agent is suggested, in which agent the basic polymer chain of a conventional polymer has been modified with a compound that contains a halogen. The methods described above involve the drawback that the fluorine compound cannot be made to adhere to the face to be treated sufficiently firmly.

OBJECTS AND SUMMARY OF THE INVENTION

The object of the present invention is a process of surface treatment suitable for a paper/board machine and for their finishing machine, by means of which process it is possible to reduce contamination of pieces and faces to a substantial extent and faces that are contaminated can be made to remain clean for a longer time. Further, if contamination takes place, the contaminants do not adhere to the face firmly but can be detached readily.

The method in accordance with the invention is characterized in what is stated in the patent claims.

DETAILED DESCRIPTION OF THE PREFERRED EMBODIMENTS

The problems of the prior-art solutions can be avoided by surface-treating the desired faces and pieces with a fluorine compound of low surface energy, which can be made to adhere firmly to the face to be treated. The fluorine compound is applied to the face, which face can be ground at the same time by means of an abrasive without changing the Ra value of the face. The purpose of the grinding is light disintegration of the face, in which connection the face can be activated. In this way a very thin film-like layer of a fluorine compound of low surface energy is prepared onto the face. The thickness of the layer that is formed is roughly equal to the length of one molecule of the fluorine compound, which can vary in the range of 1 ... 50,000 nm. The fluorine compound of low surface energy is an organic compound, which can be made to react chemically with metal atoms contained in the face or in the coating of the face, such as chromium or aluminum atoms, in which connection metal complexes are formed and/or the compound is immobilized on the free face by the effect of a physical/atomary adsorption. In the case of a metal complex, the bond becomes a very firm ionic bond, whereas in physical adsorption the organic material is spread as a very thin layer onto the free face and forms a layer of a fluorine compound of low surface energy, which cannot be replaced by a water-based solution, because the critical surface energy of moistening of the face is very low. The formation of a metal complex requires the presence of a face that is metallurgically pure, in which case no oxide layer and no contaminations are allowed to be present on the face. Physical adsorption again functions by the intermediate of suitable surface charges. Some fluorine compounds of low surface energy can be made to react chemically with chromium atoms present in stainless steel, in which connection metal complexes are formed. The layer formed on the surface of, for example, stainless steel is very thin, less than 1 $\mu$m, and highly resistant to wear, because a metal complex bond is very strong. The stainless steel must be clean from a passivation layer in order that free chromium could react with the fluorine compound. This is why it is preferable to employ a combined surface-treatment/grinding procedure.

When a ceramic face, for example a roll with a ceramic coating, is surface-treated, owing to the porosity of the ceramic the surface treatment is preferably carried out in two stages. Onto the face of a new roll, which face is still hot after manufacture, a fluorine compound of low surface energy is applied, which compound penetrates into the pores in the face and prevents contamination of the grinding emulsion in a later stage. In the second stage, the finishing grinding of the ceramic coating can be carried out by using a fluorine compound of low surface energy as an auxiliary agent. By the effect of the grinding, atomary chromium and aluminum are liberated from the Cr and Al oxides in the ceramic face, which permits formation of a bond with the fluorine compound of low surface energy. The fluorine compound, i.e. fluorine surfactant, endures severe conditions very well both thermally and chemically. By means of such fluorine compounds, it is possible to produce an exceptionally low surface energy in the face, lower than 50 mN/m, preferably lower than 20 mN/m, and highly advantageously 10 ... 16 mN/m, which arises from the very high electronegativity of fluorine in relation to hydrogen.

These fluorine compounds of low surface energy are linear compounds, in which a part of the hydrophobic chain consists of a carbon-fluorine structure, which is highly repellent in relation to contaminations and which possesses good release properties. These fluorine compounds consist of a hydrophobic chain $R_f$=F $(CF_2\ CF_2)_{3\ ...\ 8}$ and of a hydrophilic portion.

In the following Table 1, some fluorine compounds of low surface energy which are suitable for the process in accordance with the invention are described.

TABLE 1

| | COMPOUND |
|---|---|
| 1 | $R_fCH_2CH_2SCH_2CH_2CO_2Li$ |
| 2 | $(R_fCH_2CH_2O)P(O)(ONH_4)_2$ $(R_fCH_2CH_2O)_2P(O)(ONH_4)$ |
| 3 | $(R_fCH_2CH_2O)P(O)(OH)_2$ $(R_fCH_2CH_2O)_2P(O)(OH)$ |
| 4 | $R_fCH_2CH_2O(CH_2CH_2O)_xH$ |
| 5 | $R_fCH_2CH_2SO_3H$ |

$R_f=F(CF_2CF_2)_{3...8}$ x is an integer.

Preferably, suitable for the process in accordance with the invention is the surface-active fluorine compound 1, whose formula is $R_fCH_2CH_2SCH_2CH_2CO_2Li$. In this compound, lithium (Li) reacts with an atomary metal, such as chromium or aluminum, and forms bonds with incomplete valency. This is why the compound is bound with the face to be treated, and a chemically inert layer is formed, which has a very low surface energy.

The present invention is suitable for surface treatment of all objects that are contaminated in a papermaking process and that contain chromium or aluminum. By means of the process of the invention, it is possible to coat steel faces which contain chromium or aluminum as binder components as well as, in general, metal faces, and it is possible to coat new faces and to re-coat used faces. Further, the process is also suitable for coating of ceramic faces that contain Al or Cr. Also polymeric faces which contain Cr or Al compounds as filler agents can be treated in accordance with the invention. As an example might be mentioned flow faces in a headbox, chromium-plated spreader rolls, chromium-plated applicator bars (SymSizer, manufactured by Valmet Corporation), chromium-plated calender rolls, sets of plates, inner faces of mantles of suction rolls, ceramic calender rolls, ceramic centre rolls, polymer-coated rolls, or other objects which contain Al or Cr compounds, and equivalent.

The compound is applied onto new metal faces while preferably grinding with an abrasive at the same time. Used metal faces have to be cleaned before coating, in which connection layers of contaminations, oxides, etc. are removed mechanically, and/or the face can also be activated by means of chemical (e.g., alkali wash) or electrochemical (e.g., electrochemical reduction) methods.

New ceramic faces are surface-treated preferably directly after manufacture of the roll simultaneously with a mechanical treatment, for example abrasive grinding. The surface treatment and, optionally, the grinding can be repeated once or several times depending on the desired thickness of the layer of surface treatment agent.

The application of the surface treatment agent takes place by means of any method of application whatsoever that is in common use, such as atomizing, spraying, brushing or manual spreading. The concentration of the surface-active fluorine compound is 0.1 . . . 100%, preferably 25%.

Faces that have been treated by means of the process remain clean very well. The treated faces can be cleaned readily, and they have to be cleaned considerably less frequently than in the prior art. In the case of rolls, by means of the treatment, it is also possible to affect the separation of the web from a centre roll, in which case a little difference of draw of the web, better runnability, improved paper quality, etc. are achieved. Thus, also, considerable process-technical advantages are obtained, and the equipment has to be stopped less frequently because of contamination. Also, the surface treatment can be carried out at a room temperature and as a so-called on-site surface treatment, in which case the pieces or devices need not be separated from their site of use. Further, in the process, sand-blasting is not needed as a preliminary treatment, which would be inconvenient and even impossible at some sites.

The invention will be illustrated by means of the following examples, the invention being, however, not supposed to be restricted to said examples.

EXAMPLE 1

Surface Treatment of a Hard-chromium Plated Piece

Coating tests were carried out onto a hard-chromium plated piece so that the face of the piece was ground with abrasive papers of different degrees of coarseness (grit 120, 220, 500, and 1000) with $R_fCH_2CH_2SCH_2CH_2CO_2Li$, wherein $R_f=F(CF_2CF_2)_{3...8}$. A reference piece was made by just submerging the piece into liquid $R_fCH_2SCH_2CH_2CO_2Li$. After grinding and submerging, the pieces were washed with water.

From the ground and non-ground pieces, the moistening angles were measured with water and with methylene iodide, and from the moistening angles the values of surface energy were computed by means of the harmonic mean and geometric mean method.

The values of moistening angle measured with water in respect of the ground pieces varied between 95 . . . 115 degrees (grit 100 lowest, grit 1000 highest), and in respect of the piece that had just been submerged the moistening angles with water were about 65 . . . 70 degrees. In a corresponding way, the values of surface energy were for the ground pieces 16 . . . 22 mN, and for the non-ground piece about 40 . . . 45 mN/m. Thus, a mechanical treatment that was carried out in connection with the surface treatment increased the hydrophobic nature of the face.

EXAMPLE 2

Exposure of Surface-treated Pieces to Water

Test pieces prepared in a corresponding way were exposed to water under cold running water (48 hours), and the surface energy was measured after the test. The surface energy was still at a low level after the test, both with the ground pieces and with the non-ground pieces.

EXAMPLE 3

Exposure of Surface-treated Pieces to Oil

Test pieces prepared in a corresponding way were exposed to oil in hot (120° C.) mineral oil (24 hours). After the test, the faces were washed with alcohol. The surface energy was still at a low level after the test, both with the ground pieces and with the non-ground pieces.

What is claimed is:

1. A process for the surface treatment of parts in a paper/board machine or in a finishing machine, which parts contain chromium or aluminum, comprising the step of:

applying a fluorine compound of low surface energy to said parts either prior to or while said parts are being activated.

2. The process as claimed in claim 1, wherein the fluorine compound of low surface energy is $R_fCH_2CH_2SCH_2CH_2CO_2Li$ $(R_fCH_2CH_2O)P(O)(ONH_4)_2$ $(R_fCH_2CH_2O)_2P(O)(ONH_4)$ $(R_fCH_2CH_2O)P(O)(OH)_2(R_fCH_2CH_2O)_2P(O)(OH)$ $R_fCH_2CH_2O(CH_2CH_2O)_xH$, or $R_fCH_2CH_2SO_3H$ wherein $R_f=F(CF_2\ CF_2)_{3...8}$, and X is an integer.

3. The process as claimed in claim 2, wherein the fluorine compound of low surface energy is $R_fCH_2CH_2SCH_2CH_2CO_2Li$.

4. The process as claimed in claim 1, wherein the part the object to be treated is a metal face, a ceramic face, or a polymeric face that contains an admixture/filler.

5. A process for treating a surface that contains chromium or aluminum in a paper/board machine or in a finishing machine, comprising the step of:

activating said face to be treated either mechanically, chemically or electrochemically, said activation occurring either before, or at the same time as, a fluorine compound of low surface energy is applied onto said face, which compound is adapted to adhere to chromium or aluminum atoms in said face grinding the surface with an abrasive during the application of the fluorine compound of low surface energy, or grinding the surface with an abrasive after application of the fluorine compound of low surface energy.

6. A process as claimed in claim 5, wherein the fluorine compound of low surface energy is a compound which has a hydrophobic and a hydrophilic portion.

7. A process as claimed in claim 5, wherein the fluorine compound of low surface energy is $R_fCH_2CH_2SCH_2CH_2CO_2Li$ $(R_fCH_2CH_2O)P(O)(ONH_4)_2(R_fCH_2CH_2O)_2P(O)(ONH_4)$ $(R_fCH_2CH_2O)P(O)(OH)_2(R_fCH_2CH_2O)_2P(O)(OH)$ $R_fCH_2CH_2O(CH_2CH_2O)_xH$, or $R_fCH_2CH_2SO_3H$ wherein $R_f=F(CF_2\ CF_2)_{3\ldots 8}$, and x is an integer.

8. A process as claimed in claim 7, wherein the fluorine compound of low surface energy is $R_fCH_2CH_2SCH_2CH_2CO_2Li$.

9. A process as claimed in claim 5, wherein the surface active fluorine compound is applied onto a metal face or a ceramic face or onto a polymer face that contains an admixture/filler.

* * * * *

UNITED STATES PATENT AND TRADEMARK OFFICE
CERTIFICATE OF CORRECTION

PATENT NO.    : 6,423,185 B1
DATED         : July 23, 2002
INVENTOR(S)   : Mäntylä, Tapio et al.

It is certified that error appears in the above-identified patent and that said Letters Patent is hereby corrected as shown below:

<u>Title page,</u>
Item [22], the PCT filed date should read -- March 2, 1999 --.

Signed and Sealed this

Twenty-first Day of January, 2003

JAMES E. ROGAN
*Director of the United States Patent and Trademark Office*